Patented July 6, 1926.

1,591,441

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

VULCANIZATION OF CAOUTCHOUC AND PRODUCT OBTAINED THEREBY.

No Drawing. Original application filed November 5, 1923, Serial No. 672,825. Divided and this application filed March 16, 1926. Serial No. 95,156.

This application is a division of application Serial No. 672,825, filed November 5, 1923, of which the following is a specification.

My invention relates to the vulcanization of caoutchouc or rubber compounds, and it is particularly directed to increasing the rate of vulcanization to improve the resulting product and decrease its cost.

The desirability of an accelerator depends upon its power to increase the rate of vulcanization and to improve the physical characteristics of the resulting product. The effect of an accelerator may be better controlled and utilized when its chemical characteristics are known. Occasionally an entire class of compounds will be set forth as good accelerators, and, of course, it frequently occurs that certain of the compounds of such class are much more powerful than others. It sometimes happens that a compound of a class will be found to be a good accelerator, which is the only one of the class that is of any practical value in such capacity. Consequently, in order to determine the largest number of members of a certain class of elements that are effective as accelerators, it is desirable to know the chemical reactions that occur to determine what group of elements are responsible for the curing power.

One object of the present invention is to disclose a group of elements which may serve as the nucleus for a number of powerful and desirable accelerators.

Certain thiazoles have been mentioned as being accelerators of merit, and one of the first descriptions of such accelerators may be found in a prior Patent No. 1,544,687 issued July 7, 1925, jointly to myself and Clayton W. Bedford. Investigation of the thiazoles led to the discovery that a certain ring formation of elements was necessary to the structure of this class of compounds in order to produce accelerators of desirable characteristics. If the group

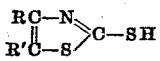

is present, an accelerator of desirable characteristics is assured. In the formula indicated, R may be H, an alkyl or aryl group and R' may be an H atom, an alkyl or aryl group. It should be noted that the C atoms, bonded to each other, may be a part of the benzene ring, as in the mercaptobenzothiazoles. However, there are a number of compounds that may be formed, as above mentioned, where R and R' are independent radicals, and it is this class of accelerators that it is desired to claim in this application. An example of such a compound is:

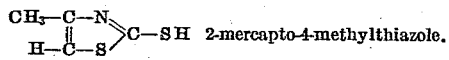

The accelerator was embodied in a compound mixture comprising 100 parts rubber, 3.5 parts sulphur, 5 parts zinc oxide and 1 part accelerator, which was well cured in five minutes at a temperature corresponding to 40 pounds of steam pressure, the product having a tensile strength of 200 kgs. per sq. cm. and an elongation of 730%.

An example of a compound obtained when R of the group

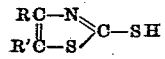

is an aryl radical, may be found in 2-mercapto-4-phenyl-thiazole

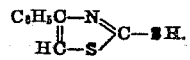

When one part of this compound was mixed with 100 parts of rubber, 5 parts of zinc oxide and 6 parts of sulphur, a well-cured product was obtained, after subjecting it to a temperature corresponding to 40 pounds of steam pressure for eight minutes.

The metallic salts, such as zinc, lead, cadmium and mercury of 2-mercapto-4-phenyl-thiazole are also accelerators of high power which impart desirable characteristics to rubber compounded therewith. As in the case of benzothiazoles disclosed in the patent referred to above, these thiazoles are also oxidized with sulfur to form the corresponding thiazyl-disulfides and polysulfides. They, too, are accelerators and may be utilized in a manner not unlike the true mercaptan. Many other derivatives are possible, which would of course include metallic salts to which reference has already been made.

A great many experiments were performed in order to determine whether the group herein disclosed was necessary to insure the formation of a powerful accelerator. It is not believed that it is necessary or desirable to set forth these experiments in detail in order to impart an understanding of the invention. It may be stated, however, that the group

may exist in straight chain compounds with no noticeable accelerating effect in rubber mixes containing them. Furthermore, it has been noted that many compounds of ring formation, embodying the last-mentioned group, although possessing an accelerating ability, are not so effective as those compounds including the group.

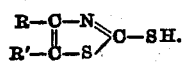

In certain of the claims, the group has been defined as having an alkyl or aryl radical bonded to the fourth carbon atom; such wording should not be strictly interpreted. This follows because the alkyl or aryl radical might be bonded to the carbon in position four or five with substantially equivalent results. Inasmuch as the nomenclature depends upon the numbering of the cyclic atoms, the group is set forth as it is numbered in order to give a definite understanding of the position of the various atoms, Although I have specifically set forth certain compounds formed about a plurality of groups as neuclei, it is obvious that other desirable and effective compounds may be produced within the scope of the invention, and I desire therefore that only such limitations shall be imposed as indicated in appended claims.

What I claim is:

1. A method of vulcanizing caoutchouc which comprises vulcanizing the same in the presence of a material embodying the following organic structure

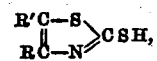

where R and R' are similar radicals.

2. A method of vulcanizing caoutchouc which comprises vulcanizing the same in the presence of a material embodying the following organic structure

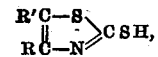

where R and R' are identical radicals.

3. A method of vulcanizing caoutchouc which comprises vulcanizing the same in the presence of a material embodying the following organic structure

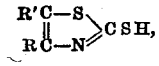

where R and R' are hydrogen atoms.

4. A caoutchouc product which has been vulcanized in the presence of a material embodying the following chemical structure

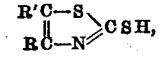

where R and R' are similar radicals.

5. A caoutchouc product which has been vulcanized in the presence of a material embodying the following chemical structure

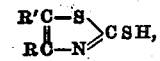

where R and R' are identical radicals.

6. A caoutchouc product which has been vulcanized in the presence of a material embodying the following chemical structure

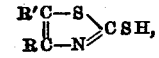

where R and R' are hydrogen atoms.

In witness whereof, I have hereunto signed my name.

LORIN B. SEBRELL.